United States Patent
Isherwood et al.

(10) Patent No.: US 10,831,380 B2
(45) Date of Patent: Nov. 10, 2020

(54) SYSTEM AND METHOD OF COLLISION MANAGEMENT IN A NAMESPACE OF A STORAGE SYSTEM

(71) Applicant: Hitachi Vantara LLC, Santa Clara, CA (US)

(72) Inventors: Benjamin Isherwood, Tewksbury, MA (US); Yury Kats, Belmont, MA (US)

(73) Assignee: HITACHI VANTARA LLC, Santa Clara, CA (US)

( * ) Notice: Subject to any disclaimer, the term of this patent is extended or adjusted under 35 U.S.C. 154(b) by 797 days.

(21) Appl. No.: 15/103,890

(22) PCT Filed: May 28, 2014

(86) PCT No.: PCT/US2014/039665
§ 371 (c)(1),
(2) Date: Jun. 13, 2016

(87) PCT Pub. No.: WO2015/183247
PCT Pub. Date: Dec. 3, 2015

(65) Prior Publication Data
US 2016/0313934 A1    Oct. 27, 2016

(51) Int. Cl.
*G06F 16/182* (2019.01)
*G06F 3/06* (2006.01)
*G06F 12/06* (2006.01)

(52) U.S. Cl.
CPC ............ *G06F 3/0619* (2013.01); *G06F 3/064* (2013.01); *G06F 3/0689* (2013.01); *G06F 12/0646* (2013.01); *G06F 16/1844* (2019.01)

(58) Field of Classification Search
CPC .... G06F 16/178; G06F 11/2094; G06F 16/27; G06F 12/0646; G06F 3/0619; G06F 16/1844
See application file for complete search history.

(56) References Cited

U.S. PATENT DOCUMENTS 4,658,250 A * 4/1987 Nering .................. G06F 13/374
                                                    370/462
5,588,147 A * 12/1996 Neeman ................ G06F 16/184
(Continued)

OTHER PUBLICATIONS

International Search Report of PCT/US2014/039665 dated Oct. 16, 2014.

*Primary Examiner* — Cheyne D Ly
(74) *Attorney, Agent, or Firm* — Mattingly & Malur PC

(57) ABSTRACT

In a namespace distributed across storage devices, collisions of objects stored in the namespace can occur. To manage collisions, first, a collision flag is provided in system metadata of the objects, and second, a predetermined naming convention is applied to the pathnames of collided objects within the namespace. A winner object of a collision is stored with the pathname of the actual object (e.g., "/object") in the namespace, and the loser object is stored with a pathname derived from the actual object (e.g., "/object.collision") and the collision flag of the loser object is set to mark the loser object within the namespace. Accordingly, winners and losers of collisions in the namespace can be identified by searching system metadata for collision flags which indicate collision losers, and associated winners can be identified based on the pathname of the losers.

19 Claims, 14 Drawing Sheets

(56) References Cited

U.S. PATENT DOCUMENTS

| | | | | |
|---|---|---|---|---|
| 7,272,654 | B1* | 9/2007 | Brendel | G06F 16/13 709/229 |
| 7,752,211 | B1* | 7/2010 | Ozekinci | G06F 11/1451 707/755 |
| 8,156,079 | B1* | 4/2012 | Ozekinci | G06F 16/13 707/640 |
| 8,311,980 | B2* | 11/2012 | Saito | G06F 16/184 707/610 |
| 8,938,428 | B1* | 1/2015 | Ozekinci | G06F 11/1458 707/640 |
| 2003/0120948 | A1* | 6/2003 | Schmidt | H04L 63/0815 726/8 |
| 2006/0195413 | A1* | 8/2006 | Davis | G06F 16/93 |
| 2007/0088725 | A1 | 4/2007 | Demiroski et al. | |
| 2008/0209007 | A1* | 8/2008 | Gurecki | H04L 67/1095 709/218 |
| 2010/0281133 | A1 | 11/2010 | Brendel | |
| 2014/0376519 | A1* | 12/2014 | Yang | H04W 74/0816 370/336 |

\* cited by examiner

| SIMPLE QUERY | STRUCTURED QUERY | ADVANCED QUERY | SAVED QUERIES | ACCOUNT MANAGEMENT |

▷ QUERY RESULTS

FIND OBJECTS THAT MATCH ALL ▼ OF THE FOLLOWING... — 1401

| NAMESPACE | ▼ | IS | ▼ | NS 1 (TEN1) | + | − |
| REPLICATION COLLISION | ▼ | IS | ▼ | TRUE | + | − |

[QUERY] [CLEAR] ☐ SHOW AS ADVANCED QUERY ▼ — 1402

☐ RESULT FILTERS

◀ PAGE 1 OF 1 ▼ GO TO PAGE [GO] RESULTS/PAGE 10 ▼ SAVE AS   EXPORT RESULTS ▼   [SAVE]
1 - 2 OF 2, FOUND IN 0.013 SECONDS   CONTROL OPERATIONS ▼   SORT RESULTS ▼

☐ /FILE2.COLLISION
OBJECT URL: HTTPS://NS1.TEN1.CLUSTER27E.LAB.ARCHIVAS.COM/REST/FILE2.COLLISION
CHANGE TIME: 2014-03-14T15:16:06-0400

☐ /LOST+FOUND/REPLICATION/AD62EDAB-41D4-469A-8FA3-95F2F246CCA5/FILE1
OBJECT URL: HTTPS://NS1.TEN1.CLUSTER27E.LAB.ARCHIVAS.COM/REST/LOST%2BFOUND/REPLICATION/AD62EDAB-41
D4-469A-8FA3-95F2F246CCA5/FILE1
CHANGE TIME: 2014-03-14T15:07:52-0400

◀ PAGE 1 OF 1 ▼ GO TO PAGE [GO]

FIG. 14

SYSTEM AND METHOD OF COLLISION MANAGEMENT IN A NAMESPACE OF A STORAGE SYSTEM

BACKGROUND

1. Technical Field

The present invention relates generally to techniques for highly available, reliable, and persistent data storage. Particularly, the present invention relates to collision management for a distributed namespace of one or more storage systems.

2. Description of the Related Art

In general, a need has developed for the storage of "fixed content" in a highly available, reliable and persistent manner that replaces or supplements traditional tape and optical storage solutions. The term "fixed content" typically refers to any type of digital information that is expected to be retained without change for reference or other purposes. Examples of such fixed content include, among many others, e-mail, documents, diagnostic images, check images, voice recordings, film and video, and the like. The traditional Redundant Array of Independent Nodes (RAIN) storage approach has emerged as the architecture of choice for creating large online archives for the storage of such fixed content information assets. By allowing nodes to join and exit from a cluster as needed, RAIN architectures insulate a storage cluster from the failure of one or more nodes. By replicating data on multiple nodes, RAIN-type archives can automatically compensate for node failure or removal. Typically, RAIN systems are largely delivered as hardware appliances designed from identical components within a closed system.

When data is replicated on multiple nodes, in some instances data can be determined as having "collided" when different changes to data are made on two nodes before the two nodes are able to synchronize the changes with one another, making it difficult to determine exactly how to synchronize the data. Conventionally, rule-based conflict resolution is performed to automatically resolve collisions. In the automatic resolution of conflicts, one piece of data is determined to be a "winner" of the collision and the other piece of data is determined to be a "loser". However, the outcome of such automatic collision resolution may not always agree with policy rules or client expectations for data storage. Accordingly, there exists a specific need to manage and identify collisions and the winners and loser of thereof so that a client and/or application can take corrective action as necessary.

SUMMARY

In a low-cost, scalable, storage system based on the RAIN model, enterprises and organizations can create permanent storage for fixed content information. The system is designed to reduce the complexity of creating and maintaining very large digital storage spaces. It provides for autonomous administration in that the administrator can set and forget policies for day-to-day operations thereof. A metadata management layer, a replication service and a flexible policy processor enable policy-driven administration. By specifying policy rules, the behavior of the system and how data is managed can be dictated. Thus, for example, users can define processes that perform metadata extraction, data encryption, compression, and replication necessary for long-term preservation of valuable data while staying compliant with domain-specific policies.

Regarding the specific configurations of the RAIN system or "cluster", there is no requirement that each machine have the same hardware or storage capabilities. The nodes support a network-based application that manages objects. The application enables the storage of data to be distributed and replicated across multiple nodes. For example, each node preferably runs a complete cluster application instance. Each node thus provides object based storage while also acting as a portal that enables access to objects stored at the respective node or at other nodes. Because runtime operations and physical storage of the objects are distributed throughout the cluster, a high level of reliability and performance are insured even as capacity grows. If a node fails, the cluster adapts by simply redirecting processing to other nodes, so data is always available to clients. The system may configures itself automatically (or substantially automatically) as specified by high-level policies. This is highly advantageous in the content of long-term management of objects because self-configuration, self-healing, and self-optimization are vital to a system that can evolve with new technology.

The RAIN system forms a content platform or cluster that is logically partitioned. One or more "tenants" reside within the cluster, where a tenant has a set of attributes including namespaces, administrative accounts, data access accounts, and a permission mask are set for each tenant. A namespace is a logical partition of the cluster that serves as a collection of objects typically associated with at least one defined application. Each namespace has a private file system with respect to other namespaces. This approach enables a user to segregate cluster data into logical partitions. A namespace associated with a given tenant is selectively configured without affecting a configuration of at least one other namespace in the set of namespaces. One configuration option is "versioning," by which an administrator can elect to enable multiple versions of a same data object to be stored in association with a given namespace. Objects stored in a namespace may each individually include system metadata, custom metadata and file data. In a namespace which is globally distributed over the cluster, when objects of a given namespace are modified at different locations within the cluster, collisions can occur. For example, when different content is written into an object with the same path name in a namespace at two different locations in the cluster, a collision will occur when the two locations in the cluster attempt to synchronize the object which has different content at the two locations. Only the content written to the object at one location can be accepted as the winner which is made available for use globally in the namespace. The other content written to the object at the other location which is not the winner is determined as the loser and separately stored in the namespace.

For managing the storage of the winner object and loser object, first, a collision flag is provided in the system metadata, and second, a predetermined naming convention is applied to the pathnames of the collided objects within the namespace. For example, the winner object is stored with the actual pathname of the object (e.g., "/object") in the namespace, and the loser object is stored with a pathname derived from the actual pathname of the object (e.g., "/object.collision") and the collision flag in the system metadata of the loser object is set to mark the loser object as a loser of a collision within the namespace. Accordingly, winners and losers of collisions in the namespace can be identified readily by searching the system metadata for collision flags which indicate collision losers, and the associated winners can be identified by parsing the pathname of the identified losers.

By identifying the winners and losers of collision, a client can verify that the automatic collision resolution (e.g., the storing of the winner and loser objects as such) was correctly performed and also take corrective action as needed. For example, if the automatic collision resolution did not properly resolve the winner and loser objects, the client may choose to promote the loser object to the winner object or rename the loser object to have a different pathname.

The foregoing has outlined some of the more pertinent features of the invention. These features should be construed to be merely illustrative. Many other beneficial results can be attained by applying the disclosed invention in a different manner or by modifying the invention as will be described.

DETAILED DESCRIPTION

BRIEF DESCRIPTION OF THE DRAWINGS

FIG. 14 shows an exemplary user GUI embodiment where one or more namespaces can be specified to query for collisions according to the present invention.

DETAILED DESCRIPTION OF THE INVENTION

Figure 1:
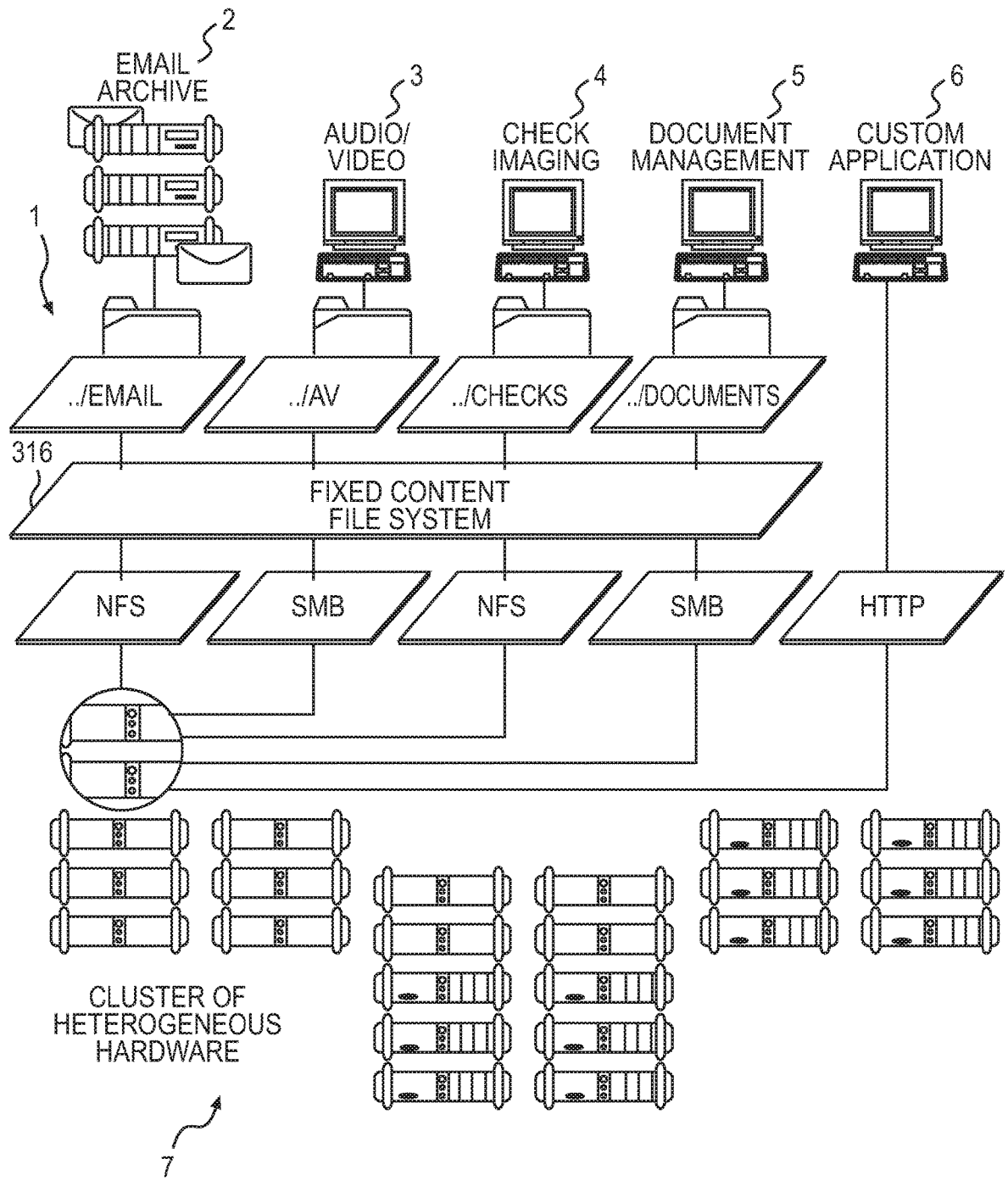
FIG. 1 is a simplified block diagram of a fixed content storage system in which the present invention may be implemented.

In the following description of the invention, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment," "this embodiment," or "these embodiments" means that a particular feature, structure, or characteristic described in connection with the embodiment is included in at least one embodiment of the invention, and the appearances of these phrases in various places in the specification are not necessarily all referring to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

Furthermore, some portions of the detailed description that follow are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the present invention, the steps carried out require physical manipulations of tangible quantities for achieving a tangible result. Usually, though not necessarily, these quantities take the form of electrical or magnetic signals or instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The present invention also relates to an apparatus and system for performing the operations herein. This apparatus may be specially constructed for the required purposes, or it may include one or more general-purpose computers selectively activated or reconfigured by one or more computer programs. Such computer programs may be stored in a computer-readable storage medium, such as, but not limited to optical disks, magnetic disks, read-only memories, random access memories, solid state devices and drives, or any other types of media suitable for storing electronic information. The algorithms and displays presented herein are not inherently related to any particular computer or other apparatus. Various general-purpose systems may be used with programs and modules in accordance with the teachings herein, or it may prove convenient to construct a more specialized apparatus to perform desired method steps. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

Exemplary embodiments of the invention, as will be described in greater detail below, provide apparatuses, methods and computer programs for collision management of objects in a namespace of a storage system.

The system configuration illustrated in FIG. 1 is purely exemplary of a storage system 1 in which the present invention may be implemented, and the invention is not limited to a particular hardware configuration. The computers and storage systems implementing the invention can also have known I/O devices (e.g., CD and DVD drives, floppy disk drives, hard drives, etc.) which can store and read the modules, programs and data structures used to implement the above-described invention. These modules, programs and data structures can be encoded on such computer-readable media. For example, the data structures of the invention can be stored on computer-readable media independently of one or more computer-readable media on which reside the programs used in the invention. The components of the system can be interconnected by any form or medium of digital data communication, e.g., a communication network. Examples of communication networks include local area networks, wide area networks, e.g., the Internet, wireless networks, storage area networks, and the like.

In the description, numerous details are set forth for purposes of explanation in order to provide a thorough understanding of the present invention. However, it will be apparent to one skilled in the art that not all of these specific details are required in order to practice the present invention. It is also noted that the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged.

As is known in the art, the operations described above can be performed by hardware, software, or some combination of software and hardware. Various aspects of embodiments of the invention may be implemented using circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

From the foregoing, it will be apparent that the invention provides methods, apparatuses and programs stored on computer readable media for optimizing protection levels when replicating data in an object storage system. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

FIG. 1 illustrates an exemplary scalable disk-based storage system 1 to which the present invention can be applied. The nodes may comprise different hardware and thus may be considered "heterogeneous." A node typically has access to one or more storage disks, which may be actual physical storage disks, or virtual storage disks, as in a storage area network (SAN) and the storage disks may be provided either internally or externally to the other hardware associated with each node. The cluster application (and, optionally, the underlying operating system on which that application executes) that is supported on each node may be the same or substantially the same. The software stack, as in FIG. 3, for example, (which may include the operating system) on each node is symmetric, whereas the hardware may be heterogeneous. Using the system, as illustrated in FIG. 1, object-based storage can be provided for many different types of content such as documents 5, e-mail 2, satellite images, diagnostic images, check images 4, voice recordings, audio/video 3, and the like, among other custom applications 6. These content types are merely illustrative and the object-based storage can be configured to store other types of data objects. High levels of reliability are achieved by replicating data on independent nodes, such as servers, for instance. Replication of data will be described later in more detail below. Preferably, each node in the cluster 7 is functionally symmetric with its peers so that any given node can perform all functions required by the storage system, the failure of any one node has little impact on the availability of the storage system.

Figure 2:
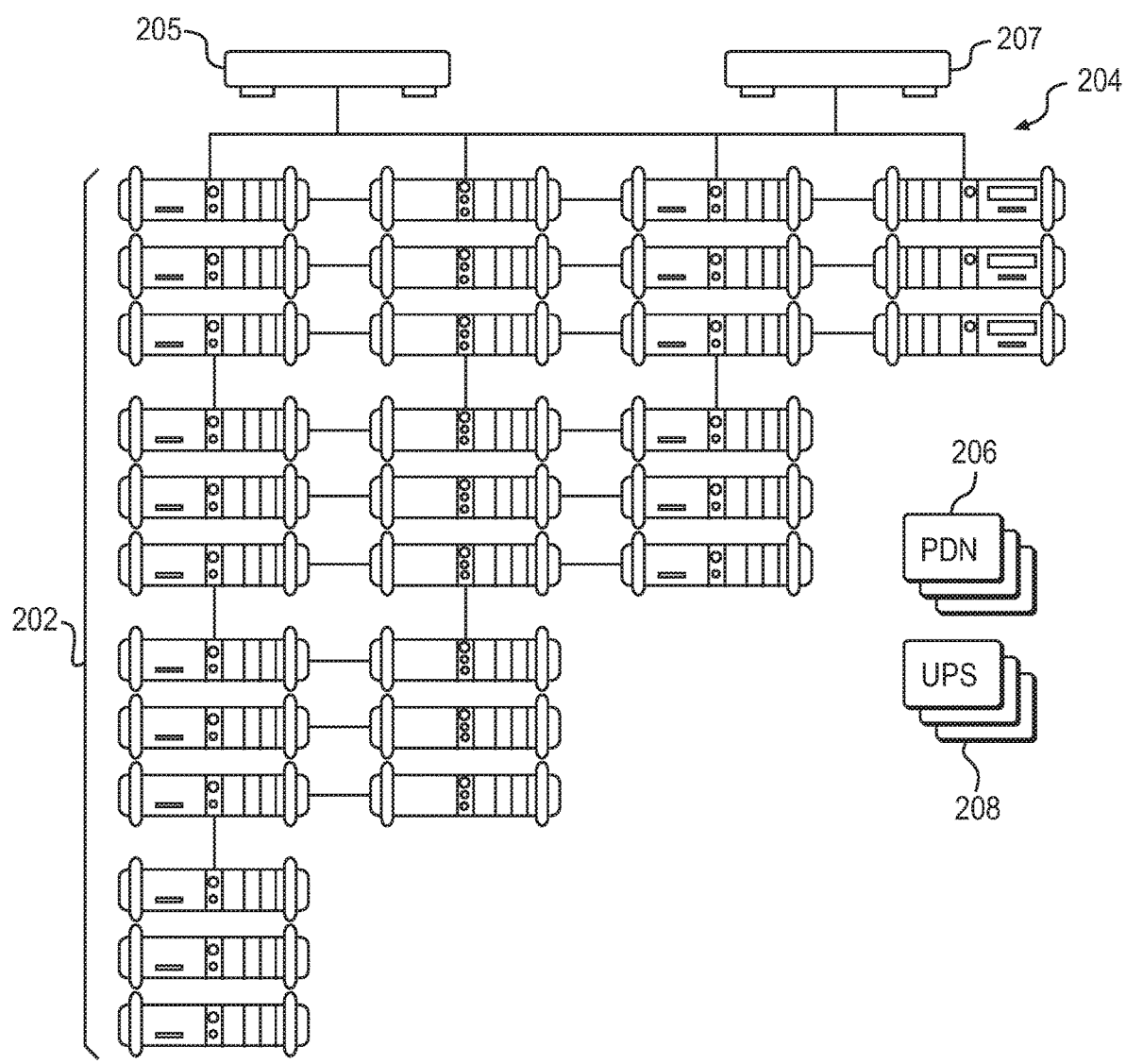
FIG. 2 is a simplified representation of a redundant array of independent nodes each of which is symmetric and supports a cluster application according to the present invention.

In a RAIN-based storage system, one or more distributed software applications are executed on each node to provide the storage functionality of the cluster. FIG. 2 illustrates one exemplary RAIN configuration. A physical boundary of an individual collection of one or more nodes is referred to as a cluster (or a storage system). Typically, a cluster is not a single device, but rather a collection of devices. Devices may be homogeneous or heterogeneous. For example, storage disks may be provided either internally or externally to the other hardware associated with each device. A typical device is a computer or machine running an operating system, such as Linux, hosted on hardware to provide a storage system that can be scaled from a few storage nodes to many nodes that store thousands of terabytes of data. This architecture ensures that storage capacity can always keep pace with an organization's increasing storage capability requirements. Accordingly, the term "storage system" as described herein may refer to one or more clusters or nodes. Thus, any reference to a storage system may include any configuration of a cluster, a collection of clusters, or nodes individually.

In storage systems such as described above, data typically is distributed across the cluster randomly so that the integrity of data is always protected from device failure. If a disk or node fails, the cluster automatically fails over to other nodes in the cluster that maintain replicas of the same data. While this approach works well from a data protection standpoint, replication of data across the cluster can lead to collisions where a given node, cluster, system, etc. stores an object and associated data while another given, node cluster, system, etc. also stores the object but with different data. A collision arises as to which of the conflicting object and data thereof should be considered as correct in the storage system. Collisions occurring during the course of replication will be described in more detail below.

As shown in FIG. 2, an illustrative cluster in which the present invention is implemented preferably comprises the following general categories of components: nodes 202, network switches 204, power distribution units (PDUs) 206, and uninterruptible power supplies (UPSs) 208. A node 202 typically comprises one or more commodity servers and contains a CPU (e.g., Intel x86, suitable random access memory (RAM), one or more hard drives (e.g., standard IDE/SATA, SCSI, or the like), and two or more network interface (NIC) cards. A typical node is a 2U rack mounted unit with a 2.4 GHz chip, 512 MB RAM, and six (6) 200 GB hard drives. However, in other instances, the hard drives are externally provided such as with storage area network (SAN) architecture, for example. The network switches 204 typically comprise one or more internal switches 205 that enables peer-to-peer communication between nodes, and one or more external switches 207 that allows extra-cluster access to each node. Each switch requires enough ports to handle all potential nodes in a cluster. Ethernet or GigE switches may be used for this purpose. PDUs 206 are used to power all nodes and switches, and the UPSs 208 are used that protect all nodes and switches. Although not meant to be limiting, typically a cluster is connectable to a network, such as the public Internet, an enterprise intranet, or other wide area or local area network. In an illustrative embodiment, the cluster is implemented within an enterprise environment. It may be reached, for example, by navigating through a site's corporate domain name system (DNS) name server. Thus, for example, the cluster's domain may be a new sub-domain of an existing domain. In a representative implementation, the sub-domain is delegated in the corporate DNS server to the name servers in the cluster itself. End users access the cluster using any conventional interface or access tool such as a GUI or API. Thus, for example, access to the cluster may be carried out over any IP-based protocol (HTTP, FTP, NFS, AFS, SMB, a Web service, or the like), via an API, or through any other known or later-developed access method, service, program, or tool.

Client applications access the storage system through one or more types of external gateways such as standard UNIX file protocols, or HTTP APIs. The cluster preferably is exposed through a virtual file system that can optionally sit under any standard UNIX file protocol-oriented facility. These include NFS, FTP, SMB/CIFS, or the like.

Figure 3:
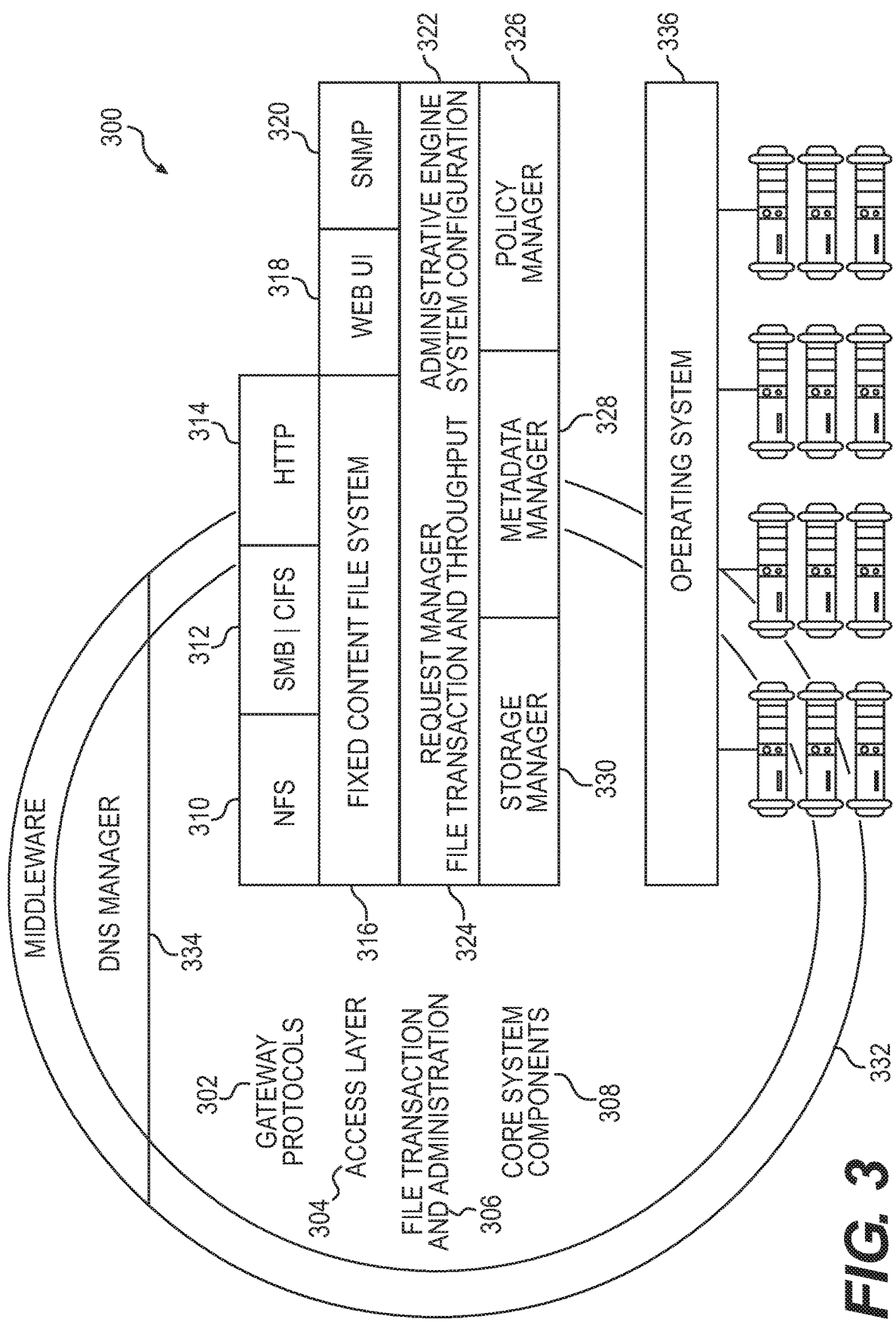
FIG. 3 is a high level representation of the various components of the cluster application executing on a given node.

As shown in FIG. 3, an instance 300 of the distributed application (which may be the same instance, or substantially the same instance), which comprises several runtime components which are executed on the nodes individually. Thus, while hardware may be heterogeneous, the software is substantially the same. These software components comprise a gateway protocol layer 302, an access layer 304, a file transaction and administration layer 306, a core components layer 308, and a replication service layer 310. The "layer" designation is provided for explanatory purposes, as one of ordinary skill will appreciate that the functions may be characterized in other meaningful ways. One or more of the layers (or the components therein) may be integrated or otherwise. Some components may be shared across layers.

The gateway protocols in the gateway protocol layer 302 provide transparency to existing applications. In particular, the gateways provide native file services such as NFS 310 and SMB/CIFS 312, as well as a Web services API to build custom applications. HTTP support 314 is also provided. The access layer 304 provides access to the storage system. In particular, according to the invention, a Fixed Content File System (FCFS) 316 emulates a native file system to provide full access to stored objects. FCFS gives applications direct access to the storage contents as if they were ordinary files. Preferably, stored content is rendered in its original format, while metadata is exposed as files. FCFS316 provides conventional views of directories and permissions and routine file-level calls, so that administrators can provision fixed-content data in a way that is familiar to them. File access calls preferably are intercepted by a user-space daemon and routed to the appropriate core component (in layer 308), which dynamically creates the appropriate view to the calling application. FCFS calls preferably are constrained by storage policies to facilitate autonomous management. Thus, in one example, an administrator or application cannot delete stored object whose retention period (a given policy) is still in force.

The access layer 304 preferably also includes a Web user interface (UI) 318 and an SNMP gateway 320. The Web user interface 318 preferably is implemented as an administrator console that provides interactive access to an administration engine 322 in the file transaction and administration layer 306. The administrative console 318 provides a dynamic view of the storage system, including stored objects and individual nodes. The SNMP gateway 320 offers storage management applications easy access to the administration engine 322, enabling them to securely monitor and control cluster activity. The administration engine monitors cluster activity, including system and policy events. The file transaction and administration layer 306 also includes a request manager process 324. The request manager 324 orchestrates all requests from the external world (through the access layer 304), as well as internal requests from a policy manager 326 in the core components layer 308.

In addition to the policy manager 326, the core components also include a metadata manager 328, and one or more instances of a storage manager 330. A metadata manager 328 preferably is installed on each node. Collectively, the metadata managers in a cluster act as a distributed database, managing all stored objects. On a given node, the metadata manager 328 manages a subset of objects, where preferably each object maps between an external file ("EF," the data/file that entered the cluster for storage) and a set of internal files (each an "IF") where the stored data is physically located. Each object stored in the cluster generally composed of three parts, system metadata, custom metadata, and object data. The details of the system metadata, custom metadata and object data will be discussed below. The same metadata manager 328 also manages a set of objects replicated from other nodes. Thus, the current state of every external file is always available to multiple metadata managers on several nodes. In the event of node failure, the metadata managers on other nodes continue to provide access to the data previously managed by the failed node. The storage manager 330 provides a file system layer available to all other components in the distributed application. Preferably, it stores the data objects in a node's local file system. Each drive in a given node preferably has its own storage manager. This allows the node to remove individual drives and to optimize throughput. The storage manager 330 also provides system information, integrity checks on the data, and the ability to traverse directly local structures.

As also illustrated in FIG. 3, the cluster manages internal and external communication through a communications middleware layer 332 and a DNS manager 334. The infrastructure 332 is an efficient and reliable message-based middleware layer that enables communication among storage system components. In an illustrated embodiment, the layer supports multicast and point-to-point communications. The DNS manager 334 runs distributed name services that connect all nodes to the enterprise server. Preferably, the DNS manager (either alone or in conjunction with a DNS service) load balances requests across all nodes to ensure maximum cluster throughput and availability.

In an illustrated embodiment, the distributed application instance executes on a base operating system 336, such as Red Hat Linux 9.0, Fedora Core 6, or the like. The communications middleware is any convenient distributed communication mechanism. Other components may include FUSE (Filesystem in USErspace), which may be used for the Fixed Content File System (FCFS) 316. The NFS gateway 310 may be implemented by a standard nfsd Linux Kernel NFS driver. The database in each node may be implemented, for example, PostgreSQL (also referred to herein as Postgres), which is an object-relational database management system (ORDBMS). The node may include a Web server, such as Jetty, which is a Java HTTP server and servlet container. Of course, the above mechanisms are merely illustrative.

Figure 13:
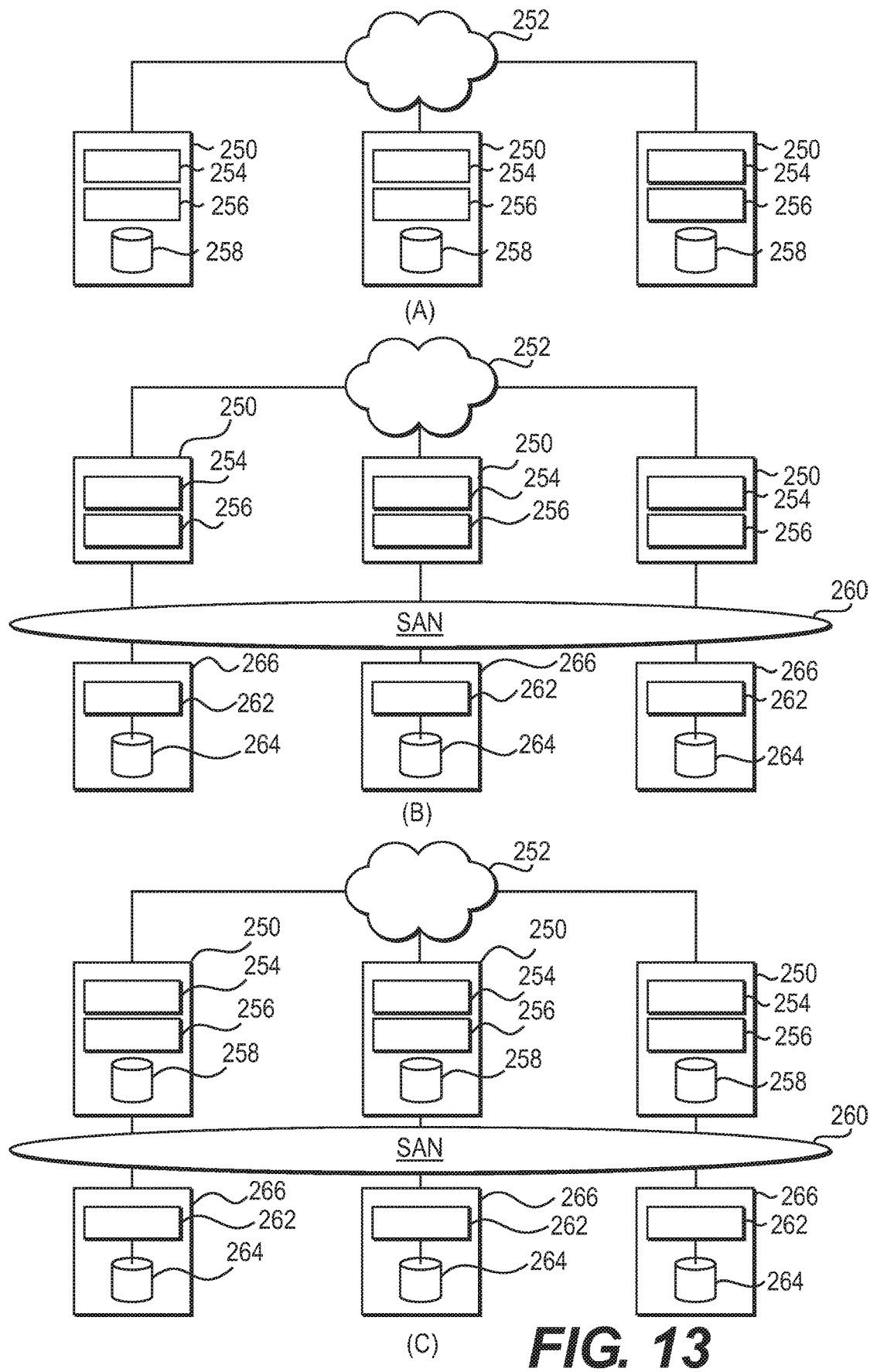
FIG. 13 is a representation of various exemplary configurations of detailed hardware configurations of storage systems according to the present invention.

The storage manager 330 on a given node is responsible for managing the physical storage devices which may either be included internally with the hardware of each node or provided externally to each node. While the description of the management of winner and loser objects herein is generally described logically with reference to the distributed namespace within which objects reside, the actual metadata and content data thereof may be stored in accordance with the physical configuration of storage devices which the namespace is configured across. FIG. 13 shows various storage configurations where nodes are provided with internal physical storage or external physical storage in accordance with the present invention.

One exemplary configuration of a storage system 252 (e.g., HCP300) according to the present invention is shown in FIG. 13(*a*). In this configuration, each node 250 includes a CPU 254, memory (RAM) 256, and at least one internal storage device (HDD) 258 for storing data objects (e.g., standard IDE/SATA, SCSI, SATA II or the like). Each storage device 258 of each node 250 is provided to the distributed application by the node 250 and each storage device 258 stores both the data content 64 and associated metadata 62, 63 of the storage system. The internal storage device 258 has one or more namespaces logically configured thereon. As shown in FIG. 13(*a*), and mentioned above, each node 250 is connectable to a network 252, such as the public Internet, an enterprise intranet, or other wide area or local area network. Additionally, the nodes are enabled to have peer-to-peer communication therebetween.

In another exemplary storage system configuration according to the present invention (e.g., HCP 500) shown in FIG. 13(*b*), a plurality of nodes 250 are connected to a storage area network (SAN) 260, which includes a plurality of storage devices 266. Similar to the above configuration, each node 250 includes a CPU 254 and memory 256. However, the node 250 does not include an internal storage device. Rather the nodes according to the configuration of FIG. 13(*b*) are connected to a SAN 260 and the nodes boot from the SAN-attached storage devices 266. Each external storage device 266 includes a controller 262 and one or more storage drives 264. The storage area network 260 may be virtualized, by the controller 262, presenting logical disks to the client application.

The storage devices 266 include a plurality of storage drives 264 which store the data content 64 and associated metadata 62, 63 of the storage system. Each storage drive 264 is, for example, a hard disk drive (HDD), semiconductor storage device (SDD) or the like of a type such as SAS (serial attached storage), SATA (Serial ATA), SATA II, FC (Fibre Channel), PATA (Parallel ATA), and SCSI. The storage device 266 provides the application with storage areas of the storage devices 264 in units of logical storage areas provided by controlling the storage drives, with the controller 262, in accordance with a method such as, for example, a RAID (Redundant Arrays of Inexpensive (or Independent) Disks) or the like. Further, as shown in FIG. 13(*b*), each node 250 is connectable to a network 252, such as the public Internet, an enterprise intranet, or other wide area or local area network. Additionally, the nodes are enabled to have peer-to-peer communication therebetween.

In yet another exemplary storage system configuration according to the present invention (e.g., HCP500-x) shown in FIG. 13(*c*), a plurality of nodes 250 are connected to a SAN, which includes a plurality of storage devices 266, similar to the configuration of FIG. 13(*b*). According to this storage system, each node 250 includes an internal storage device 264 (HDD, SATA, SATA II, and the like), which stores metadata 62, 63 only of the data content 64 stored by the storage system. In addition, each node 250 includes a CPU 254 and memory 256. The nodes 250 are attached to the SAN 260 and the external storage devices 266. The external storage devices 266 include a plurality of storage drives, which store the data content 64 of the storage system. In other words, in the configuration shown in FIG. 13(*c*), metadata is stored on internal storage devices 258 while the content data is stored on external storage devices 266.

Each storage drive 264 is, for example, a hard disk drive (HDD), semiconductor storage device (SDD) or the like of a type such as SAS (serial attached storage), SATA (Serial ATA), SATA II, FC (Fibre Channel), PATA (Parallel ATA), and SCSI. The storage device provides the application with a storage area of the storage device in units of logical storage areas provided by controlling the storage drives, with the controller, in accordance with a method such as, for example, a RAID (Redundant Arrays of Inexpensive (or Independent) Disks) or the like. Further, as shown in FIG. 13(*c*), each node is connectable to a network 252, such as the public Internet, an enterprise intranet, or other wide area or local area network. Additionally, the nodes are enabled to have peer-to-peer communication therebetween.

Accordingly, one or more nodes 250 or clusters may be comprised of the configuration shown and described with reference to any of FIGS. 13(*a*) to 13(*c*) and other nodes or clusters may be comprised of the configuration as shown and described with reference to FIG. 13(*b*), but each is connected via network 252(*s*) and part of the same overall storage system. In other words, combinations of multiple different types of storage system configurations (e.g., the configurations shown and described in FIGS. 13(*a*)-(*c*)) may provide namespaces and object storage in accordance with the present invention. In addition, storage systems may be located in different geographic locations, although this is not a limitation or requirement.

Of course, the system configurations illustrated in FIGS. 1-3 and 13 are purely exemplary embodiments of the replicated object storage systems in which the present invention may be implemented, and the invention is not limited to a particular hardware configuration. The computers and storage systems implementing the invention can also have known I/O devices (e.g., CD and DVD drives, floppy disk drives, hard drives, etc.) which can store and read the modules, programs and data structures used to implement the above-described invention. These modules, programs and data structures can be encoded on such computer-readable media. For example, the data structures of the invention can be stored on computer-readable media independently of one or more computer-readable media on which reside the programs used in the invention. The components of the system can be interconnected by any form or medium of digital data communication, e.g., a communication network. Examples of communication networks include local area networks, wide area networks, e.g., the Internet, wireless networks, storage area networks, and the like.

Preferably, each storage manager instance is responsible for a single root directory into which all files are placed according to a placement algorithm. Multiple storage manager instances can be running on a given node at the same time, and each usually represents a different physical disk in the system. The storage manager abstracts the drive and interface technology being used from the rest of the system. When the storage manager instance is asked to write a file, it generates a full path and file name (e.g., "pathname" 621) for the representative object for which it will be responsible for storing. In a representative embodiment, each object to be stored on a storage manager is received as raw data to be stored, with the storage manager then adding system metadata, and custom metadata when necessary, to the file as it stores the data to keep track of different types of information. Storing this additional metadata with the internal file data provides for additional levels of protection. In particular, scavenging can create external file records in the database from the metadata stored in the internal files. Other policies can validate internal file hash against the internal file to validate that the internal file remains intact.

Internal files may be "chunks" of data representing a portion of the original "file" in the object, and they may be placed on different nodes to achieve striping and protection blocks. This breaking apart of an external file into smaller chunked units is not a requirement, however; in the alternative, internal files may be complete copies of the external file. Typically, one external file entry is present in a metadata manager for each stored object, while there may be many internal file entries for each external file entry. Typically, internal file layout depends on the system. In a given implementation, the actual physical format of this data on disk is stored in a series of variable length records.

The request manager 324 is responsible for executing the set of operations needed to perform storage actions by interacting with other components within the system. The request manager supports many simultaneous actions of different types, is able to roll-back any failed transactions, and supports transactions that can take a long time to execute. The request manager further ensures that read/write operations in the storage system are handled properly and guarantees all requests are in a known state at all times. It also provides-transaction control for coordinating multiple read/write operations across nodes to satisfy a given client request. In addition, the request manager caches metadata manager entries for recently used files and provides buffering for sessions as well as data blocks.

A storage system's primary responsibility is to store an unlimited number of files on disk reliably. A given node may be thought of as being "unreliable," in the sense that it may be unreachable or otherwise unavailable for any reason. A collection of such potentially unreliable nodes collaborate to create reliable and highly available storage. Generally, there are two types of information that need to be stored: the files themselves and the metadata about the files which includes system metadata and custom metadata. Additional details of the fixed content distributed data storage can be found in U.S. Patent Publications 2007/0189153 and 2006/0026219, which are incorporated herein by reference.

Figure 4:
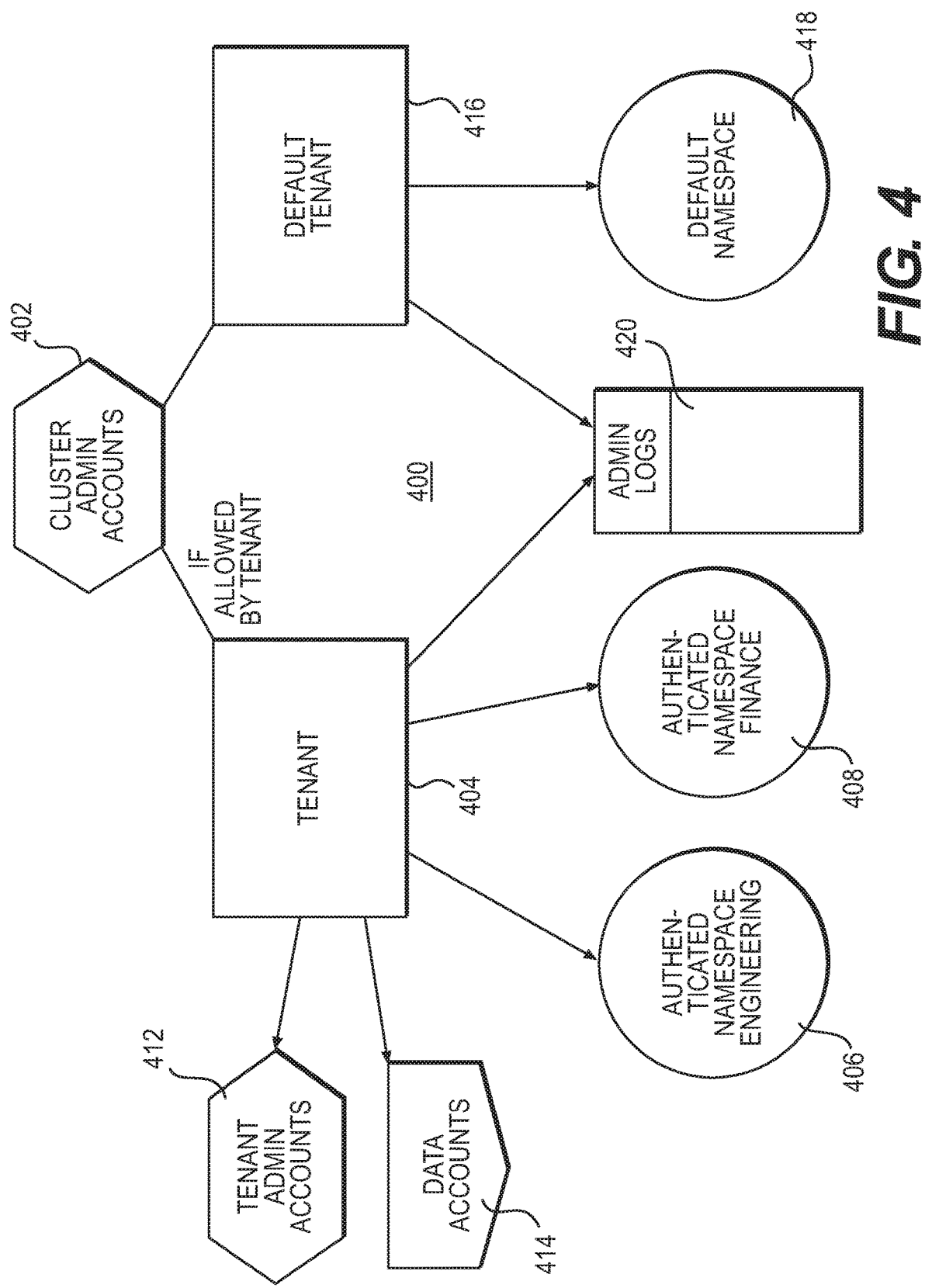
FIG. 4 illustrates an example of how a cluster is partitioned into tenants and namespaces.

The cluster is logically partitioned into one or more "tenants" which reside within the storage system, where a tenant has a set of attributes including namespaces, administrative accounts, data access accounts, and a permission mask. FIG. 4 illustrates an example of how a storage system is partitioned into tenants and namespaces.

As shown in FIG. 4, there is an instance of a cluster 400, such as the system illustrated in FIGS. 2-3 and described above. A cluster administrator has an account 402. An appropriate administrator is given authority to create a top level tenant (TLT) 404, and one or more namespaces for that TLT, such as a first authenticated namespace 406 (for an engineering department) and a second authenticated namespace 408 (for a finance department). An appropriate administrator also sets up administrator accounts 412 and data accounts 414 for the TLT. In addition, an administrator can also enable a default tenant 416 having an associated default namespace 418. Although not shown, authorized administrators may also set up subtenants. The administrator also establishes administrative logs 420. Of course, the above configuration is merely exemplary, as the subject matter herein is not limited to any particular type of use case.

At a macro level, all namespaces can be considered as the same or substantially the same entities with the same qualities and capabilities. Generally, and as will be seen, a namespace has a set of associated capabilities that may be enabled or disabled as determined by an appropriately credentialed administrator. A single namespace can host one or more applications, although preferably a namespace is associated with just one defined application (although this is not a limitation). A namespace typically has one or more of the following set of associated capabilities that a namespace administrator can choose to enable or disable for a given data account: read (r)—includes reading files, directory listings, and exists/HEAD operations; write (w); delete (d); purge (p)—allows one to purge all versions of a file; privileged (P)—allows for privileged delete and privileged purge; and search (s).

Using namespaces, and as illustrated generally in FIG. 4, an administrator can create multiple domains for a cluster, which domains differ based upon the perspective of the user/actor. These domains include, for example, the following: access application, cluster admin, TLT admin, subtenant admin, and replication. The domain of the access application is a given namespace. An authorized administrator (such as admin 402) has a view of the cluster as whole. As shown, the administrator 402 can create a top-level tenant and perform all of the administration for actions that have cluster scope. In certain situations, such as enterprise deployments, the tenant may grant appropriate administrators the ability to manage the tenant, in which case any cluster admin also will be able to function as a TLT admin. The TLT admin creates namespaces, data accounts and subtenants. The TLT is able to modify some configuration settings, such as namespace quotas or to enable versioning. The subtenant admin is able to create a namespace under a subtenant. The domain of replication is a set of TLTs defined by the cluster administrator while configuring replication between clusters.

One of ordinary skill in the art will appreciate that a tenant is a logical partition of the cluster as viewed by an administrator. As shown in FIG. 4, a tenant may represent an organization or a department using a portion of a cluster. A tenant may be implemented as a hierarchy in that it can contain other tenants. Moreover, namespaces can be considered as further logical partitioning of the cluster which essentially serves as a collection of objects particular to at least one defined application.

As will be described, each namespace has a private filesystem with respect to other namespaces. Moreover, access to one namespace does not grant a user access to another namespace. The cluster may have an upper bound on the number of namespaces allowed to be partitioned thereon (e.g., up to 100).

A tenant preferably has a set of attributes: namespaces, administrative accounts, data access accounts, permission mask, roll-up of state, name, and quotas. A tenant may contain zero or more namespaces. A tenant will have a set of administrative accounts (such as account 412) that enable users to monitor and update attributes of the tenant. The data access accounts are the set of accounts which access namespace objects. A permission mask (r/w/d/p/P/s) is the set of permissions global to the tenant and that mask a namespace's permissions. The roll-up of state are the metrics on all namespaces within the tenant. The name of the tenant is settable and changeable by an appropriate administrator. Tenant names within the same cluster must not collide. A top level tenant preferably is assigned a hard storage quota by the administrator. The appropriate admin can lower or raise that quota, and he or she can assign as much quota as desired. The TLT can also specify a soft quota, which is a given percentage of the hard quota. A tenant is able to divide its quota among one or more namespaces, but the total assigned quota may not exceed that of the tenant. For accounting purposes, preferably the quota will measure the rounded up size of an ingested file to the nearest block size. A soft quota is typically a predetermined percentage (e.g., 85%) of a hard quota, but this value may be configurable. Once the hard quota is exceeded, no further writes are allowed, although in-progress writes preferably are not blocked. It may be acceptable to have a delay between exceeding a quota and having future writes blocked. Preferably, quotas are replicated but cannot be changed. When a replica becomes writable, the quota is enforced there as well.

A tenant administrator also has a set of roles that include one or more of the following: a monitor role, an administrator role, a security role, and a compliance role. A monitor role is a read-only version of an administrator role. The administrator role is the primary role associated with a tenant. As described and illustrated above, this role allows an admin user to create namespaces under the current tenant, and it provides a view of all namespaces within this tenant (and associated statistics such as file counts, space available, space used, etc.). The administrator also can view tenant and namespace logs, and he or she can view/update tenant and namespace configuration. The security role gives a user the ability to create/modify/delete new administrative users. A user with the security role can add and delete roles from other tenant-level administrative accounts. When the tenant is first created, preferably there is one administrative user associated with the tenant, and this user account has just the security role. The compliance role enables privileged delete and retention class functions (as defined below).

A namespace is a logical storage space as viewed by an application. According to the subject matter herein, a particular namespace is distinct from a different namespace, and access to one namespace does not grant a user access to another namespace. Preferably, administration of a namespace is performed at the owning tenant level. Moreover, preferably a namespace may only be deleted if a count of objects associated with that namespace is zero. A namespace preferably also has the following attributes: permission mask, initial settings, other settings, display name, quota, logs, and stats. As noted above, the permission mask (r/w/d/p/P/s) is the set of settings global to the namespace and which mask an account's permissions. The initial settings identify a data protection level (DPL), a hashing scheme, and the like, that preferably remain persistent. The other settings refer to settings (such as retention, shred, versioning, indexing, and the like) that can be set on the namespace and then later changed. This feature is described in more detail below. The display name is a name or other identifier for the namespace. The quota is either hard (in GB) or soft (in percent). The logs attribute identifies the system events related to the namespace that will be logged. The stats attribute identifies the statistics that are generated from namespace-related data, such as capacity, number of objects, and the like.

Preferably, tenant names and namespace names are human readable identifiers in the various administrative user interfaces (Us). Preferably, these names also are used in hostnames to specify the namespace of a data access request, the tenant which an administrator is administrating, and the scope over which a search should be confined. The namespace name is useful because a tenant may have more than one namespace associated with it. Preferably, object access over HTTP uses a hostname which complies with conventional domain name system (DNS) standards. As noted above, tenant names on a cluster must not collide.

Figure 5:
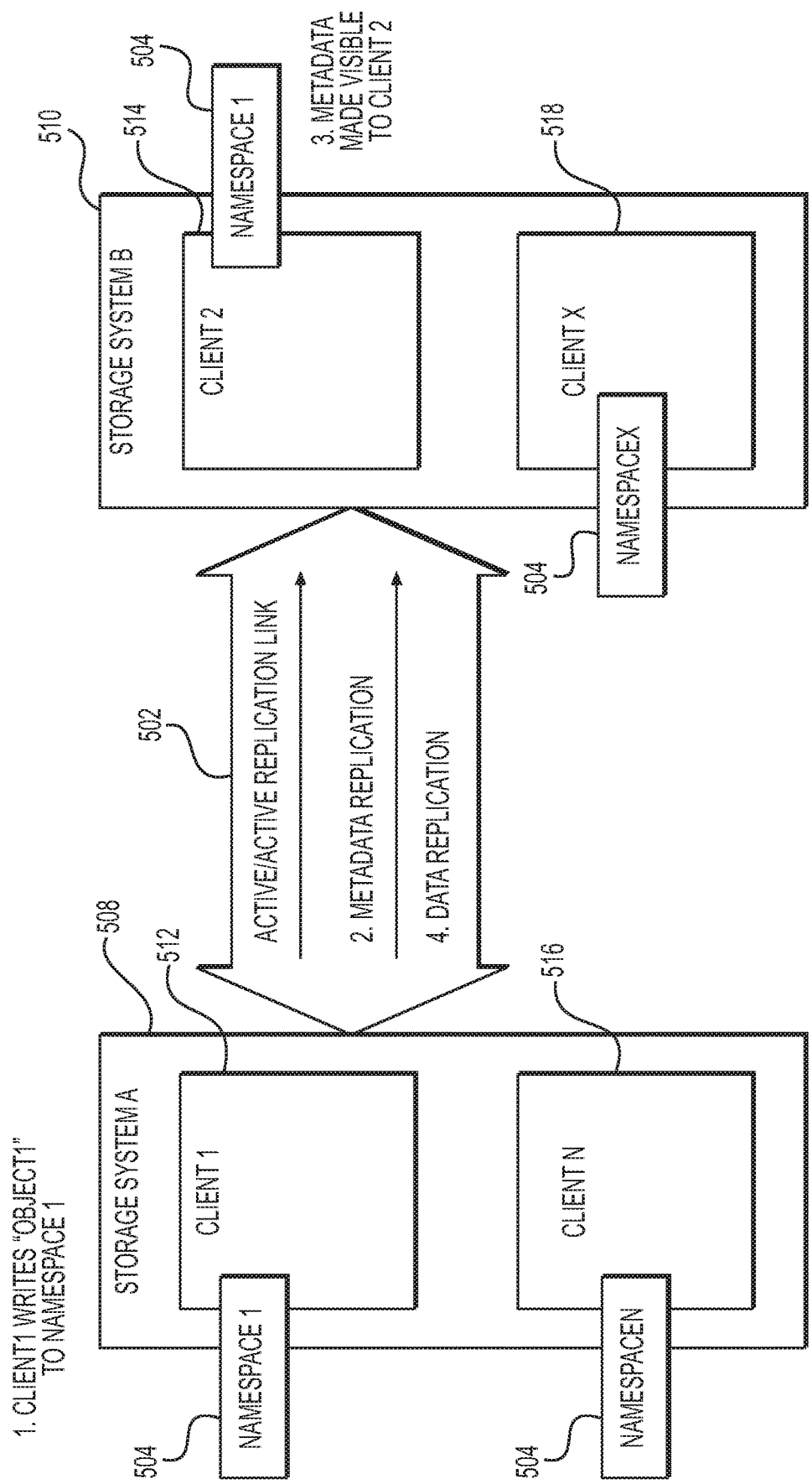
FIG. 5 is a representation of replication of object data in a namespace.

The following provides additional details of the replication of objects and how writing to the same object within a given namespace can lead to collisions of object data. As shown in FIG. 5, storage systems A 508 and B 510 are connected using an active/active replication link 502. One or more namespaces 504, such as Namespace 1, are configured and replicated on both storage systems. In this case, storage system A receives a write from a client1 to write an object, which is given the object path "/object1." After the object is committed to disk on system A, the metadata for/object1 is transferred over the replication link to system B. System B receives the metadata and makes/object1 visible to client 2. Before system B makes/object1 visible to client2 using the metadata, however, system B performs collision processing. Thereafter, the data associated with the metadata of/object1 is transferred to system B (if necessary according to the service plan of system B).

The hardware configurations of storage system A and storage system B are not limiting to the present invention. Storage system A may have multiple distributed namespaces residing thereon and may serve multiple clients or applications. Illustrated in FIG. 5 is an exemplary situation in which client1 is writing/object1 to namespace1 and client n 516 is able to access a namespace referred to as namespace n. The active/active replication link exists via network(s) between system A and system B. System B also has namespace 1 residing thereon and the data objects stored on namespace1 on system A are replicated in namespace1 on system B.

Namespace1 on system B serves client 2, although it may also serve multiple clients and have multiple namespaces, same as system A. For example, as illustrated in FIG. 5, system B also has a namespace referred to as namespace y, which client x 518 is able to access. The management of collisions according to the present invention may be implemented in any of or each of the namespaces shown in FIG. 5.

The process of determining whether there is a conflict of content data due to a collision within a namespace involves determining an object that is a "winner" and an object that is a "loser." The winner object is an object that system B has determined to be the object to be used (between the existing object and the incoming object) by a storage system (and subsequently made visible) for a given object path in the namespace. The winner can be identified in a variety of different manners. In one or more embodiments, the winner is identified by having the most recent change time. However, other criteria can be used instead of or in combination with the change time to determine the outcome of a given collision.

Namely, when a collision occurs for a given object at a given location, a new object will be created as a loser object. The newly created loser object exists within the namespace at the given location and will need to be synchronized across all other systems which support the namespace. For example, in the active/active replication link topology of FIG. 5, a new loser object created on system A will have its corresponding metadata transferred over the replication link to system B. As object data flows both from system A to system B and from system B to system A, collisions will occur on both system A and system B. Each of system A and B will create a corresponding loser object due to the collisions which will be managed with the collision flag and naming convention of the present invention. The replication of object metadata and object data in active/active replication topologies is described in co-pending application which is being filed concurrently with the present application and is herein incorporated by reference.

Figure 6:
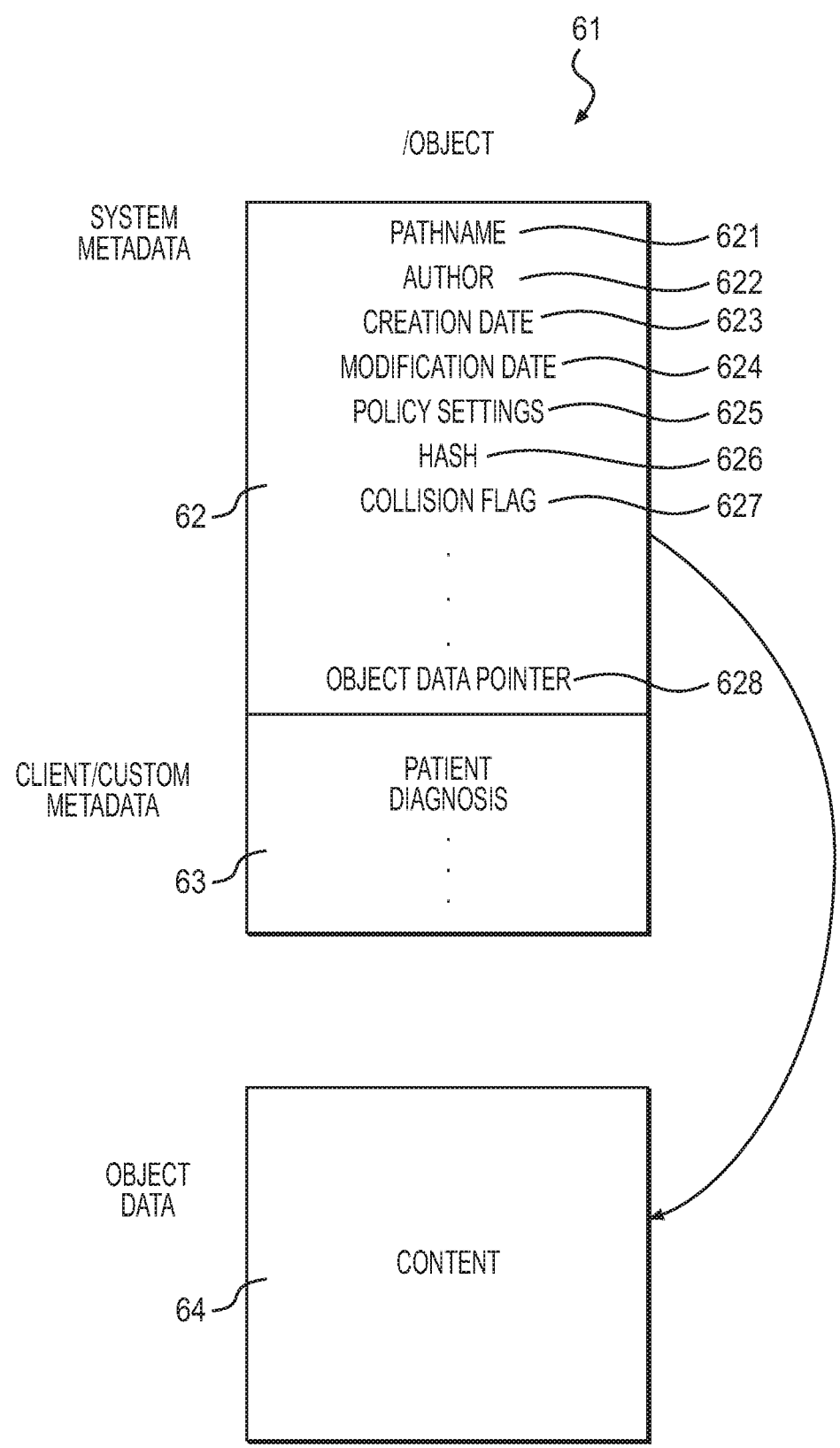
FIG. 6 is a simplified representation of the data structure of an object according to the present invention.

FIG. 6 shows a simplified representation of the data structure of an exemplary object 61 according to the present invention. Each namespace is a logical partition which serves to store objects and each namespace has a private file system with respect to other namespaces. Within a given namespace, a stored object is made up of system metadata 62, custom metadata 63 and object data 64. The object data 64 is the content of the EF provided to the cluster to be stored. Alternatively, in the case where multiple IFs correspond to a given EF, the content is generally used to represent the IFs. The custom metadata 63 is information specified by a client or application which can provide additional information for managing and identifying the object data. For example, in a namespace which stores patient records of a hospital, the custom metadata may be set to include patient information, diagnosis information, treatment information, etc. The system metadata 62 is information which specifies information for identifying the object 61 within the given namespace.

By way of example, the system metadata 62 can include: pathname 621, author 622, creation timestamp 623, modification (or change time) timestamp 624, policy settings 625, a hash of the object data content 626, a pointer to the object data content in the cluster 628, and a collision flag 627. However, the present invention is not intended to be limited to foregoing list and the scope of the present invention includes other types of metadata which one of ordinary skill in the art would recognize as useful in the management of object-based storage. Of particular relevance to the present invention are the pathname 621 and collision flag 627 metadata which will become more apparent as explained below.

Figure 7:
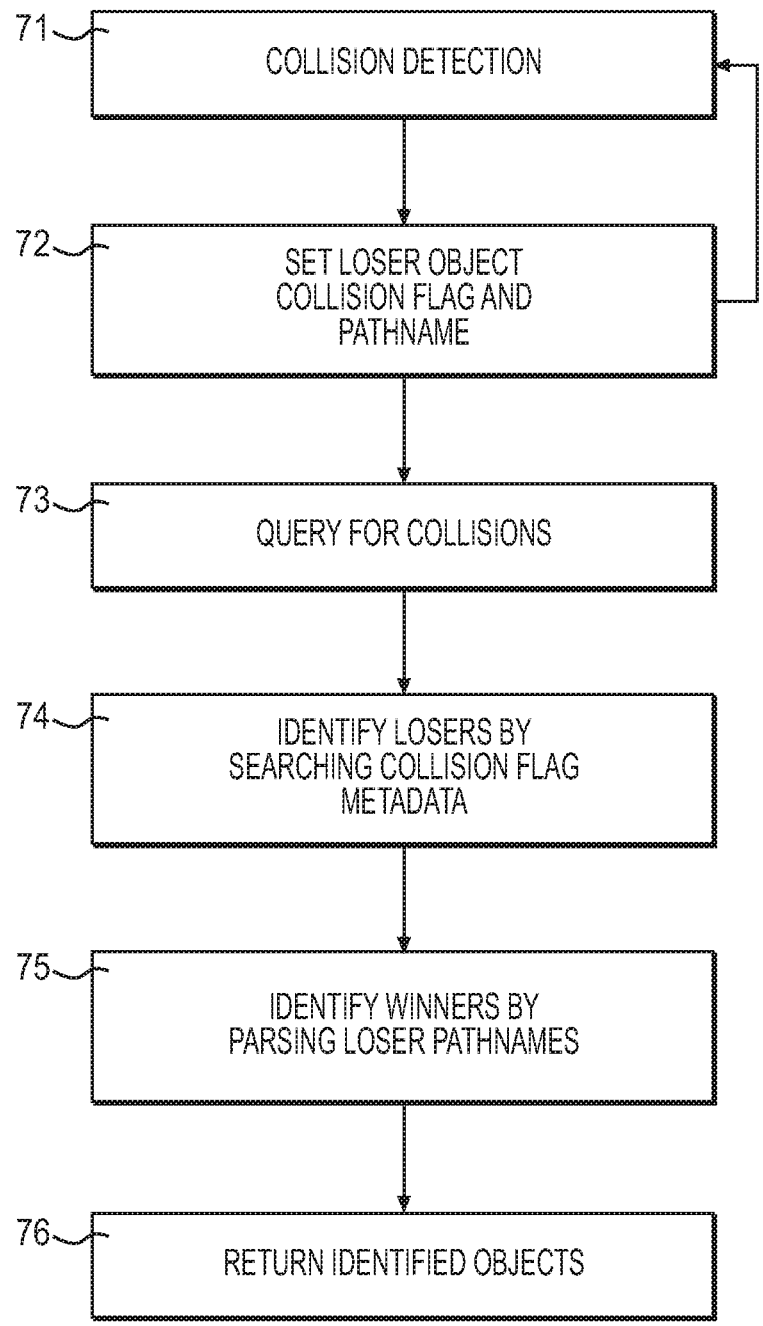
FIG. 7 is a high level representation of a general processing flow according to the present invention.

FIG. 7 shows a general processing flow for managing winner and loser objects and querying the cluster for collisions. Generally, as the Replication Service 310 performs replication within a given namespace, collisions will be detected. Collision detection 71 is disclosed, for example, in U.S. Pat. No. 8,572,022 which is herein incorporated by reference.

A loser object is modified as follows. As one part of collision management, the Collision Flag in the system metadata of the loser object is changed 72 to indicate that the object is in fact a loser of a collision. For example, upon notification from the Replication Service 310 that a collision has occurred, the Metadata Manager 328 will set the Collision Flag 627 in the loser object to identify the loser object as the loser. However, the Collision Flag 627 alone does not identify the winner object with which the loser object has collided. Two objects which have collided in a namespace, will collide when the same pathname 621 to an object has different IF data at two different storage locations (e.g., nodes, clusters, etc.). As a second part of collision management, the pathname 621 of the loser object is modified according to a predetermined naming convention to identify the winner object with which the loser object collided.

Figure 8:
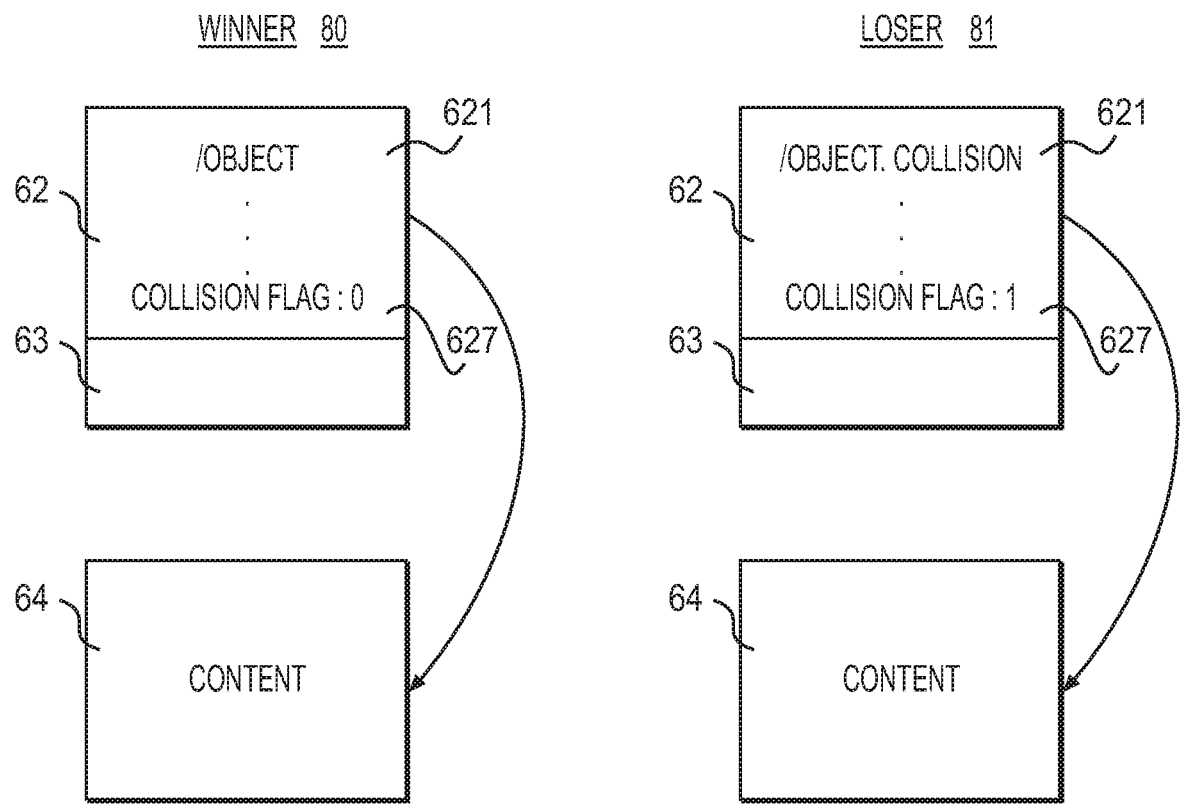
FIG. 8 illustrates an example of the relationship between winner and loser objects of a collision according to the present invention.

FIG. 8 illustrates an example of the relationship between winner 80 and loser 81 objects of a collision according to the present invention. In this example, the loser object 81 has a collision flag 627 set to '1' in the system metadata 62 which indicates the loser object 81 as a loser object of a collision. Further, in the system metadata 62, the loser object pathname 621 is modified according to a predetermined naming convention. In this example, the naming convention is to append ".collision" to the end of the loser object 81 pathname 621. By virtue of the collision flag 627 and the naming convention, the loser object 81 is indicated to be a loser object and the winner object 80 is identified by pathname by removing the ".collision" from the loser object pathname 621. Further, the winner object 80 retains the pathname 621 of the object in the namespace which was used prior to the collision and does not have a collision flag 627 indicative of loser object (e.g., collision flag is set to "0"). In FIG. 8, the loser object's 81 system metadata 62 points to the location where the IF data 64 of the loser object 81 is stored, whereas the winner object's 80 system metadata 62 points to the location where the IF data of 64 the winner object 80 is stored.

Returning to FIG. 7, upon one or more collisions causing the creation and storage of winner and loser objects 72 as in FIG. 8, for example, it becomes possible for the namespace to be queried for collisions 73. Upon receiving a query for collisions 73, within the namespace, all objects having collision flags set to '1' can be readily identified as losers of collisions 74. However, the present invention is not limited to querying for all collided objects within a given namespace, but that queries for collisions can also be directed to subsections of the namespace as well. FIG. 14 shows an exemplary user GUI where one or more namespaces can be specified to query for collisions.

In the GUI of FIG. 14, a user or client can enter a query 1401 to search a given namespace (e.g., "ns1 (ten1)" in FIG. 14) and specify to return replication collisions by selecting true 1402 (e.g., selecting "true" from the drop down menu). The storage system 1 can then search the namespace for collisions. For example, by searching the system metadata of all objects in the given namespace for collision flags 627 set to "1" and/or checking that all objects in the "/lost+found/" directory have collision flags 627 set to "1", loser objects in the namespace can be efficiently identified. In contrast, searching the system metadata 62 of all objects in the given namespace for collisions by pathnames 621 is a less efficient, particularly as the number of objects and complexity of the namespace grow. Having found the loser objects according to the collision flag 627 metadata as described above, the associated winner objects can easily be identified from the pathnames 621 of the loser objects as described herein. The results of an exemplary replication collision query are shown in FIG. 14. Moreover, one of ordinary skill in the should readily appreciate that the foregoing techniques described for the GUI of FIG. 14 can be applied and/or extended to an API for applications to achieve the same advantageous effects.

Accordingly, the winner objects can be readily identified by naming convention applied to the loser objects. As a result, loser objects and winner objects of collisions within a namespace can be readily identified and provided to a user via a GUI or to an application via an API. A user and/or an application can then easily perform corrective action to the automatic collision handling of the storage system. As described later, winner and loser objects can be moved, renamed or promoted after being identified from a query as described above.

Figure 9:
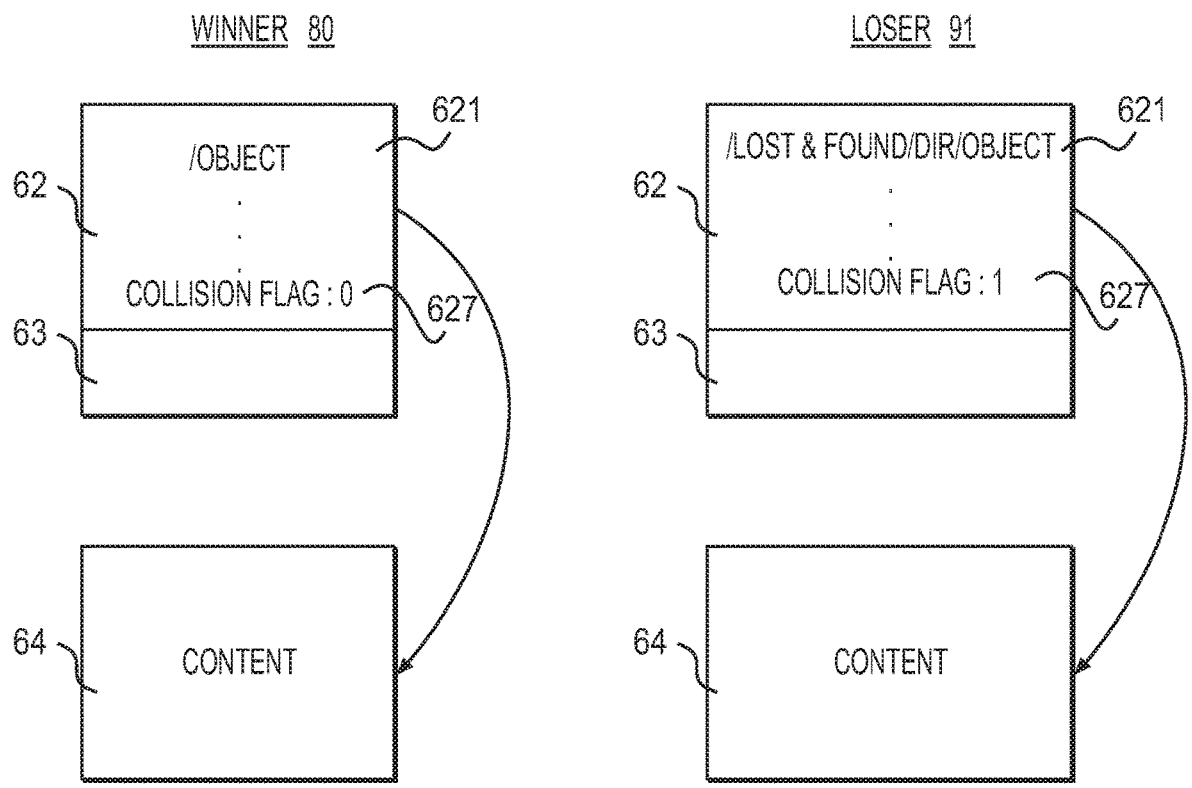
FIG. 9 illustrates another example of the relationship between winner and loser objects of a collision according to the present invention.

While FIG. 8 illustrates an example of the relationship between winner 80 and loser 91 objects of a collision according to one predetermined naming convention, other naming conventions are also considered to be within the scope of the present invention. FIG. 9 illustrates another example of the relationship between winner 80 and loser 91 objects of a collision according to the present invention. In this example, similar to FIG. 8, the loser object 91 has a collision flag 627 set to '1' in the system metadata 62 which indicates the loser object 91 as a loser object of a collision. Further, in the system metadata, the loser object pathname 621 is modified according to a predetermined naming convention. As shown in FIG. 9, the naming convention is to place the loser object 91 within a predetermined folder in the namespace. In this example, the predetermined folder is named "lost+found" and the loser object pathname 621 is modified according to this naming convention to become "/lost+found/dir/object". By virtue of the collision flag 627 and the naming convention 621, the loser object 91 is indicated to be a loser object 91 stored in a specific folder and the winner object 80 is identified by pathname 621 by removing the "lost+found" portion of the pathname 621 from the loser object 91 pathname 621. In the case that the winner object 80 is stored in a sub-directory, the "Mid" portion of the loser object 91 pathname 621 identifies the subdirectory where the winner object 80 is stored. Further, the winner object 80 retains the pathname 621 of the object in the namespace which was used prior to the collision and does not have a collision flag 627 indicative of loser object (e.g., collision flag 627 is set to "0"). In FIG. 9, the loser object's 91 system metadata 62 points to the location where the IF data 64 of the loser object 91 is stored. Meanwhile, the winner object's 80 system metadata 62 points to the location where the IF data 64 of the winner object is stored. Other predetermined folder names can be used in place of "/lost+found" to store loser objects in accordance with the example described above.

Figure 10:
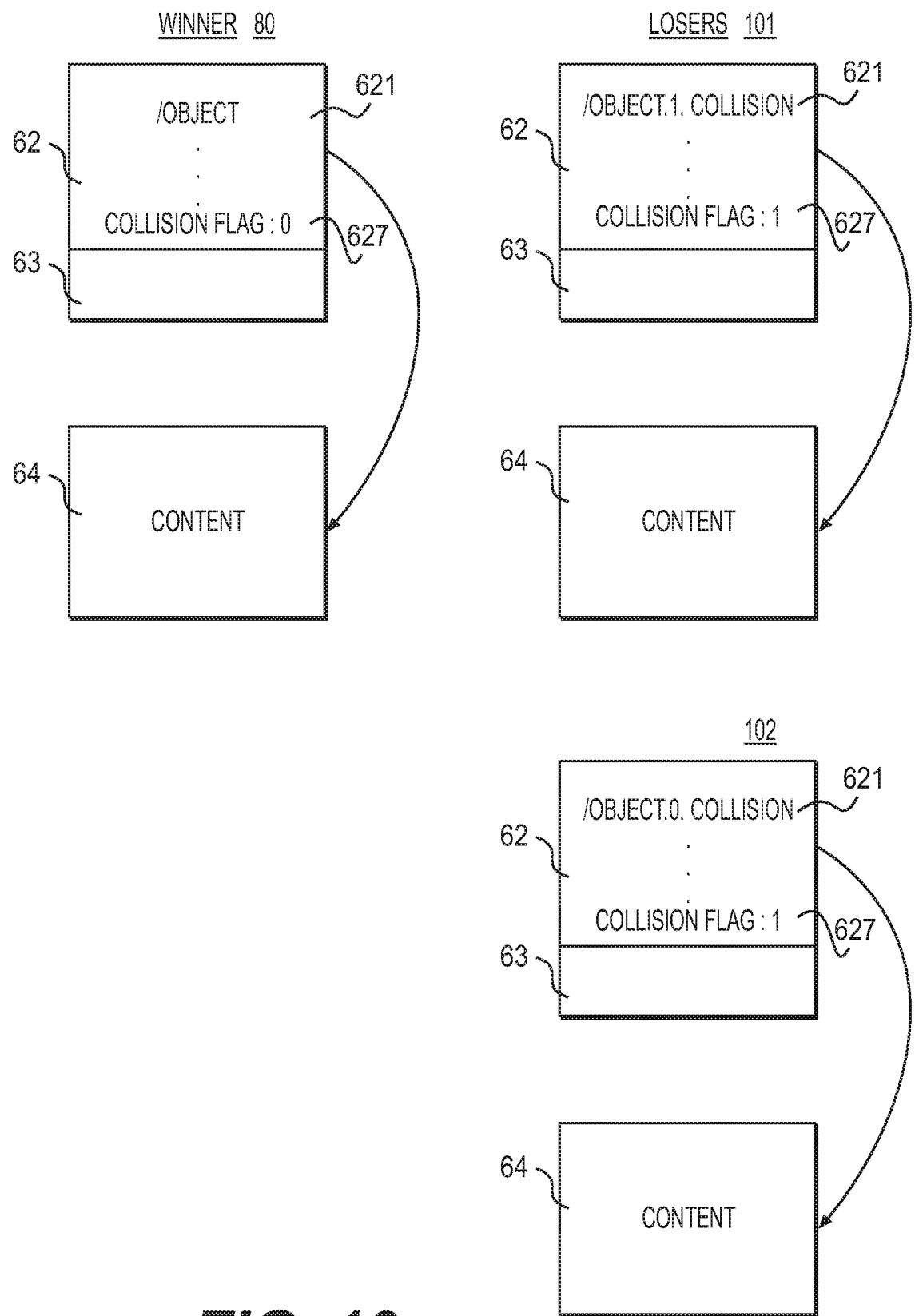
FIG. 10 illustrates still another example of the relationship between a collision winner and multiple loser objects according to the present invention.

FIG. 10 illustrates still another example of the relationship between a collision winner 80 and multiple loser objects 101, 102 according to the present invention. In this example, similar to FIG. 8, each of the loser objects 101, 102 has a collision flag 627 set to '1' in the system metadata 62 which indicates the loser object as a loser object of a collision. Further, in the system metadata 62, the loser object pathname 621 is modified according to a predetermined naming convention. As shown in FIG. 10, the loser object pathname 621 is modified according to a predetermined naming convention which allows multiple collisions to be managed. In this example, the naming convention is to append a collision number (e.g., 1, 2, 3, . . . ) and ".collision" to the end of the loser object pathname 621. By virtue of the collision flag 627 and the naming convention 621, each of the loser objects 101, 102 is indicated to be a loser object and the winner object 80 is identified by pathname 621 by removing the ".collision" from the loser object pathname 621 while also indicating how many collisions have occurred. Thus, for the loser object 102 of a first collision relating to an arbitrary object, the pathname 621 is modified to "/object.0.collision". If another collision occurs with the arbitrary object (e.g., the winner object 80 associated with "/object.0.collision"), the next loser object 101 is modified to have a pathname 621 of "object.1.collision". For subsequent collisions, the loser object has a collision number which is incremented by 1 in the pathname 621 thereof.

Further, the winner object 80 retains the pathname 621 of the object in the namespace which was used prior to the collision and does not have a collision flag indicative of loser object (e.g., collision flag is set to "0") similar to the examples shown in FIGS. 8 and 9. Accordingly, in FIG. 10, the loser objects' 101, 102 system metadata 62 points to the location where the respective IF data 64 of the respective loser object 101, 102 is stored. Meanwhile, the winner object's system metadata 62 points to the location where the IF data 64 of the winner object 80 is stored.

By implementing a collision flag 627 in the system metadata 62 and using a predetermined naming convention to identify winner and loser objects, these objects can be modified to correct or alter the automatic collision detection. For example, a user or application may wish to associate the IF data 64 of a loser object with the pathname 621 of the respective winner object. Such an operation would promote the loser object to become the winner object and the winner object could then become the loser object. In other instances, a user or application may wish to rename the loser object so that it is no longer associated with the winner object. Such an operation would rename the loser object to have a different pathname 621 which may not identify the winner object.

Figure 11:
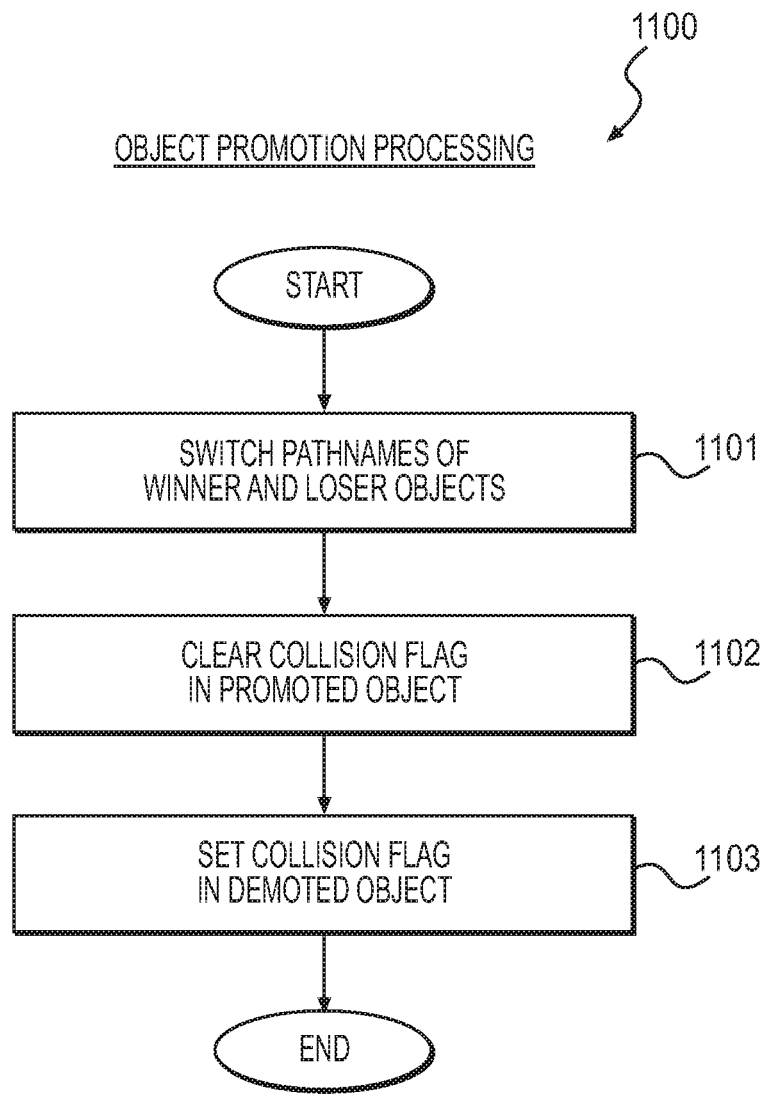
FIG. 11 is a high level representation of object promotion processing according to the present invention.

FIG. 11 is a high level representation of object promotion processing 1100. The promotion of a loser object requires that the pathnames of the winner and loser objects be switched 1101. In the newly promoted winner object (e.g., the pre-promotion loser object), the collision flag 627 is cleared to indicate that the object is not a collision loser 1102. In the newly demoted loser object (e.g., the pre-promotion winner object), the collision flag 627 is set to indicate that the object is a collision loser 1103. Accordingly, within the namespace, the IF data 64 which was initially determined by automatic collision detection of the replication service to be associated with a loser object can be modified post-collision to be associated with the winner object pathname 621. The foregoing promotion processing 1100 can be provided to a user via a GUI or to an application via an API which has access to the namespace. The operations allow the user to view each loser object and respective metadata 62 thereof and the user may select different operations using the interface to promote a loser object, for example.

Figure 12:
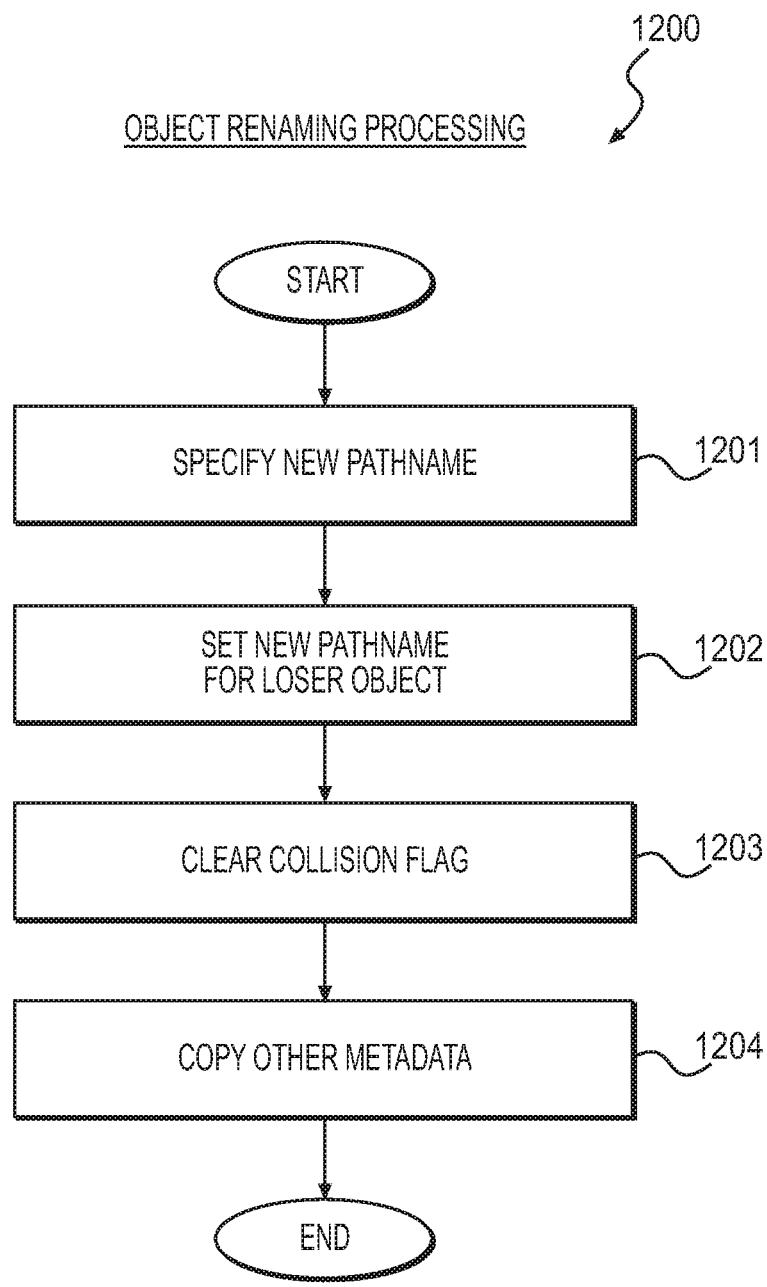
FIG. 12 is a high level representation of object renaming processing according to the present invention.

FIG. 12 is a high level representation of object renaming processing 1200. Similar to the object promotion processing 1100, object renaming processing 1200 may be implemented for a user via a GUI or to an application via an API which has access to the namespace. A new pathname is specified for the loser object 1201. The new pathname is set in the system metadata of the loser object 1202. The collision flag of the loser object is cleared to indicate that the object is not a collision loser 1203. Further, in some instances, other metadata, such as custom metadata 63, may also be modified or copied at this time 1204. Accordingly, within the namespace, the IF data 64 which was initially determined by automatic collision detection of the replication service to be associated with a loser object can be modified post-collision to become a separate, modifiable object within the namespace.

Of course, the systems and configurations illustrated and described herein are purely exemplary of storage systems in which the present invention may be implemented, and the invention is not limited to a particular hardware configuration. The computers and storage systems implementing the invention can also have known I/O devices (e.g., CD and DVD drives, floppy disk drives, hard drives, etc.) which can store and read the modules, programs and data structures used to implement the above-described invention. These modules, programs and data structures can be encoded on such computer-readable media. For example, the data structures of the invention can be stored on computer-readable media independently of one or more computer-readable media on which reside the programs used in the invention. The components of the system can be interconnected by any form or medium of digital data communication, e.g., a communication network. Examples of communication networks include local area networks, wide area networks, e.g., the Internet, wireless networks, storage area networks, and the like.

In the description, numerous details are set forth for purposes of explanation in order to provide a thorough understanding of the present invention as they pertain to management of winner and loser objects in a distributed namespace. However, it will be apparent to one skilled in the art that not all of these specific details are required in order to practice the present invention. It is also noted that the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged.

As is known in the art, the operations described above can be performed by hardware, software, or some combination of software and hardware. Various aspects of embodiments of the invention may be implemented using circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

From the foregoing, it will be apparent that the invention provides methods, apparatuses and programs stored on computer readable media for managing collisions in a distributed namespace in an object storage system. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

What is claimed is:

1. A system comprising:
a plurality of storage devices; and
one or more processors coupled to the storage devices, and configured to:
logically partition storage space provided by the storage devices into a namespace which stores a plurality of objects each including data and metadata;
determine, from two objects of the plurality of objects which have collided in the namespace, a winner object and a loser object, and mark the loser object of the collision with a collision flag included in the metadata;
receive a query for collisions in the namespace; and
return, in response to receiving the query, the loser object based on the collision flag,
wherein the one or more processors coupled to the storage devices are further configured to:
set a new pathname for the loser object; and
clear, in response to setting the new pathname for the loser object, the collision flag included in the metadata of the loser object.

2. The system according to claim 1, wherein the one or more processors coupled to the storage devices are further configured to:
modify a pathname of the winner object with which the loser object collided;
clear, in response to setting the new pathname for the loser object and modifying the pathname of the winner object, the collision flag included in the metadata of the loser object; and
mark, in response to clearing the collision flag included in the metadata of the loser object, the winner object of the collision with a collision flag included in the metadata of the winner object.

3. The system according to claim 1, wherein the one or more processors coupled to the storage devices are further configured to:
determine the winner object and the loser object based on timestamps of the two objects which have collided, hash values of the two objects which have collided, or storage locations of the two objects which have collided.

4. The system according to claim 1, wherein the one or more processors coupled to the storage devices are further configured to:

set the new pathname of the loser object to indicate a pathname of the winner object with which the loser object collided, and identify the winner object based on the pathname of the loser object.

5. The system according to claim 1, wherein the one or more processors coupled to the storage devices are further configured to:

set the new pathname of the loser object to indicate a pathname of the winner object with which the loser object collided, and store the loser object and the winner object in a same directory of the namespace.

6. The system according to claim 1, wherein the one or more processors coupled to the storage devices are further configured to:

set the new pathname of the loser object to indicate a pathname of the winner object with which the loser object collided, and move the loser object into a predetermined directory of the namespace different from a directory of the winner object.

7. The system according to claim 1, wherein the one or more processors coupled to the storage devices are further configured to:

return, in response to receiving the query, the loser object based on the collision flag and further return, in response to receiving the query, a pathname, a number of collisions, and a change time of the loser object.

8. The system according to claim 1, wherein the one or more processors coupled to the storage devices are further configured to:

replicate the metadata of the loser object, including the collision flag, to other storage devices partitioned into the namespace.

9. A system comprising:

a plurality of storage devices; and one or more processors coupled to the storage devices, and configured to:

logically partition storage space provided by the storage devices into a namespace which stores a plurality of objects each including data and metadata;

determine, from two objects of the plurality of objects which have collided in the namespace, a winner object and a loser object, and mark the loser object of the collision with a collision flag included in the metadata;

receive a query for collisions in the namespace; and return, in response to receiving the query, the loser object based on the collision flag, wherein the one or more processors coupled to the storage devices are further configured to:

modify the pathname of the loser object to indicate a pathname of the winner object with which the loser object collided, and identify the winner object based on the pathname of the loser object.

10. The system according to claim 9, wherein the one or more processors coupled to the storage devices are further configured to:

clear, in response to modifying the pathname for the loser object, the collision flag included in the metadata of the loser object.

11. The system according to claim 9, wherein the one or more processors coupled to the storage devices are further configured to:

modify a pathname of the winner object with which the loser object collided;

clear, in response to modifying the pathname for the loser object and modifying the pathname of the winner object, the collision flag included in the metadata of the loser object; and mark, in response to clearing the collision flag included in the metadata of the loser object, the winner object of the collision with a collision flag included in the metadata of the winner object.

12. The system according to claim 9, wherein the one or more processors coupled to the storage devices are further configured to:

determine the winner object and the loser object based on timestamps of the two objects which have collided, hash values of the two objects which have collided, or storage locations of the two objects which have collided.

13. The system according to claim 9, wherein the one or more processors coupled to the storage devices are further configured to:

store the loser object and the winner object in a same directory of the namespace.

14. The system according to claim 9, wherein the one or more processors coupled to the storage devices are further configured to:

move the loser object into a predetermined directory of the namespace different from a directory of the winner object.

15. The system according to claim 9, wherein the one or more processors coupled to the storage devices are further configured to:

return, in response to receiving the query, the loser object based on the collision flag and further return, in response to receiving the query, a pathname, a number of collisions, and a change time of the loser object.

16. The system according to claim 9, wherein the one or more processors coupled to the storage devices are further configured to:

replicate the metadata of the loser object, including the collision flag, to other storage devices partitioned into the namespace.

17. A system comprising:

a plurality of storage devices; and one or more processors coupled to the storage devices, and configured to:

logically partition storage space provided by the storage devices into a namespace which stores a plurality of objects each including data and metadata;

determine, from two objects of the plurality of objects which have collided in the namespace, a winner object and a loser object, and mark the loser object of the collision with a collision flag included in the metadata;

receive a query for collisions in the namespace; and return, in response to receiving the query, the loser object based on the collision flag and further return, in response to receiving the query, a pathname, a number of collisions, and a change time of the loser object.

18. The system according to claim 17, wherein the one or more processors coupled to the storage devices are further configured to:

determine the winner object and the loser object based on timestamps of the two objects which have collided, hash values of the two objects which have collided, or storage locations of the two objects which have collided.

19. The system according to claim 17, wherein the one or more processors coupled to the storage devices are further configured to:

replicate the metadata of the loser object, including the collision flag, to other storage devices partitioned into the namespace.

* * * * *